(12) United States Patent
King et al.

(10) Patent No.: US 8,425,116 B2
(45) Date of Patent: Apr. 23, 2013

(54) SPLIT GUIDE BUSHING FOR VERTICAL PULVERIZERS

(75) Inventors: George King, Ware, MA (US); Joshua Creelman, Auburn, MA (US); William Freeman, Townsend, MA (US)

(73) Assignee: Babcock Power Services, Inc., Worcester, MA (US)

( * ) Notice: Subject to any disclaimer, the term of this patent is extended or adjusted under 35 U.S.C. 154(b) by 1146 days.

(21) Appl. No.: 12/328,093

(22) Filed: Dec. 4, 2008

(65) Prior Publication Data

US 2010/0142865 A1 Jun. 10, 2010

(51) Int. Cl.
*F16C 29/02* (2006.01)
*F16C 35/02* (2006.01)
*F16C 43/02* (2006.01)

(52) U.S. Cl.
USPC ............... 384/29; 384/26; 384/271; 384/272

(58) Field of Classification Search ............ 384/21, 384/26, 29, 32, 268, 271–272, 276, 280–282, 384/427, 457; 403/202, 313, 344, 352
See application file for complete search history.

(56) References Cited

U.S. PATENT DOCUMENTS

| | | | | |
|---|---|---|---|---|
| 1,485,621 A | * | 3/1924 | Loeffler | 403/352 |
| 1,649,258 A | * | 11/1927 | Rummins | 384/427 |
| 1,742,513 A | * | 1/1930 | Leonard | 384/457 |
| 1,858,753 A | * | 5/1932 | Taylor | 384/276 |
| 1,904,535 A | * | 4/1933 | Richards | 474/96 |
| 2,233,955 A | * | 3/1941 | Miller | 400/641 |
| 2,533,597 A | * | 12/1950 | Maier | 403/344 |
| 2,986,416 A | * | 5/1961 | Firth | 403/357 |
| 3,076,865 A | * | 2/1963 | Volk et al. | 174/146 |
| 3,456,965 A | * | 7/1969 | Harrison et al. | 285/260 |
| 3,874,194 A | * | 4/1975 | Filepp et al. | 464/154 |
| 4,705,223 A | * | 11/1987 | Dibowski et al. | 241/117 |
| 4,907,751 A | * | 3/1990 | Wark et al. | 241/119 |
| 5,242,123 A | * | 9/1993 | Parham | 241/37.5 |
| 5,538,192 A | | 7/1996 | Parham | |
| 5,549,251 A | | 8/1996 | Provost | |
| 5,681,126 A | * | 10/1997 | Lin | 403/313 |
| 5,873,144 A | * | 2/1999 | Tupper et al. | 16/18 CG |
| 5,904,307 A | | 5/1999 | Prairie et al. | |
| 5,957,300 A | | 9/1999 | Nardi et al. | |
| 6,021,967 A | | 2/2000 | Clyne et al. | |
| 6,109,817 A | * | 8/2000 | Burns et al. | 403/305 |
| 6,180,882 B1 | * | 1/2001 | Dinh | 174/655 |
| 6,241,199 B1 | * | 6/2001 | Ismert | 248/56 |
| 6,347,758 B1 | | 2/2002 | Mizak et al. | |
| 6,381,829 B2 | | 5/2002 | Piepho et al. | |
| 6,694,666 B2 | * | 2/2004 | Iwabuchi | 43/25 |
| 6,752,361 B2 | * | 6/2004 | Chou | 248/74.1 |
| 6,840,782 B1 | * | 1/2005 | Borden et al. | 439/92 |
| 7,028,931 B2 | | 4/2006 | Lin et al. | |
| 7,172,146 B2 | | 2/2007 | Schmitz et al. | |
| 7,830,264 B2 | * | 11/2010 | Tetiyevsky | 340/572.8 |
| 2007/0215730 A1 | | 9/2007 | Martin et al. | |

* cited by examiner

*Primary Examiner* — Marcus Charles
(74) *Attorney, Agent, or Firm* — Edwards Wildman Palmer LLP; Joshua L. Jones

(57) ABSTRACT

A guide bushing for a tensioning rod in a vertical pulverizer includes a bushing body having a substantially cylindrical interior bushing surface configured and adapted to moveably engage a tensioning rod of a vertical pulverizer. The bushing body is divided circumferentially about the bushing surface into a plurality of sections joined together. The sections are configured and adapted to separate from one another for installation and removal of the bushing body about a tensioning rod of a vertical pulverizer.

18 Claims, 5 Drawing Sheets

SPLIT GUIDE BUSHING FOR VERTICAL PULVERIZERS

BACKGROUND OF THE INVENTION

1. Field of the Invention

The present invention relates to vertical pulverizers, and more particularly, to guide bushings for tensioning rods of vertical pulverizers.

2. Description of Related Art

A variety of devices and methods are known in the art for pulverizing raw materials. Of such devices, many are directed to pulverizing coal for use as a fuel. In coal-fired furnaces, for purposes of improved and more efficient ignition, it is preferred to pulverize the coal to a fine powder before introducing it into the furnace for combustion. Coal pulverization involves systematically comminuting coal to a desired, preferably optimum size, e.g. a fine powder, prior to introduction into a coal-fired furnace. Currently, coal pulverization systems include ball tube type mills, high-speed attrition type pulverizers, and vertical roller type mills.

Ball tube type mills are low speed mills that have their origins in the 1930's and 1940's. The ball tube type mill comprises a plurality of hardened steel balls that are disposed in a large, rotatable barrel. While the barrel rotates, coal is introduced into the barrel ends. Through the rotating action of the barrel, the steel balls fall and cascade onto the coal, pulverizing the coal by the impact of the cascading steel balls. The pulverized coal is then removed and fed into a coal-fired furnace. Ball tube type mills are successfully used in conjunction with highly abrasive coal. Ball tube mills rotate at approximately 20 RPM.

A high speed attrition type pulverizer typically, as in the ATRITA® pulverizer available from Riley Power Inc. of Worcester, Mass. (U.S. Pat. Nos. 7,172,146 and 7,028,931) provides three stages of pulverization. Each stage is powered by a common rotary assembly. Coal enters the first (crushing) section where a plurality of rotating and reciprocating swing hammers crush the coal against a grid. The grid deters passage of coal that has not been crushed sufficiently to a preferred nominal size, e.g. about ¼ inch. Once the coal has been reduced to a nominal size, it passes through a grid section and then is introduced into the second section where coal particles are forced to rub together by a set of impellers on a rotating disk, further reducing the coal size. Next, it enters a section where it is forced between a set of high speed rotating pegs and stationary clips. Then the coal exits through a rejecter assembly (while coarse particles are forced back into the previous section for further size reduction), to the final third section. The third section is an exhauster section which transports the fine, pulverized coal in a fluid stream to the coal-fired furnace.

Vertical roller type mills pulverize coal on a rotating grinding table. A plurality of rollers typically cast in abrasion resistant material apply a shearing force downward onto the carrier table and thus apply a grinding pressure to the coal. On the top of the carrier table is mounted a set of segments cast from a similar abrasion resistant material. The pulverized coal is then removed from the mill using a high velocity stream of air and fed into a coal-fired furnace. Vertical pulverizers' rotating tables typically turn at approximately 25 RPM.

Loading the grinding rollers in most vertical coal pulverizers has typically been via hydraulic cylinders. Hydraulic cylinders are used as a tool to preload tensioning rods which act on the roller assemblies to transfer the grinding pressure onto the coal and grinding table. The tensioning rod must be free to move either way in the vertical direction to load and unload the system. A guide bushing around the tensioning rod provides a bushing surface to accommodate this vertical movement. Typically, the guide bushing is located inside a doghouse structure which provides protection for the guide bushing and other loading assembly components held within from factory contaminants. The doghouse also encloses part of the seal air system. Previously known guide bushings are unitary structures that must be mounted over an end of the tensioning rod. Typical guide bushings consist of several cast or forged pieces welded together. When a typical guide bushing or tensioning rod needs to be replaced due to wear or failure, the procedure for replacement is difficult and time consuming. The end of the tensioning rod must be freed so the guide bushing can be removed over the end of the tensioning rod. This involves removing the doghouse structure and transferring the load of the guide frame, classifier and/or other massive components so that the tensioning rod can be freed. Approximately three to five days of downtime can result when replacement of a guide bushing is required.

Such conventional methods and systems have generally been considered satisfactory for their intended purpose. However, there still remains a continued need in the art for a guide bushing that is easier to remove and/or install about a tensioning rod. There also remains a need in the art for such a guide bushing that is easy to make and use. The present invention provides a solution for these problems.

SUMMARY OF THE INVENTION

The subject invention is directed to a new and useful guide bushing for a tensioning rod in a vertical pulverizer. The guide bushing includes a bushing body having a substantially cylindrical interior bushing surface configured and adapted to moveably engage a tensioning rod of a vertical pulverizer. The bushing body is divided circumferentially about the bushing surface into a plurality of sections joined together. The sections are configured and adapted to separate from one another for installation and removal of the bushing body about a tensioning rod of a vertical pulverizer.

In accordance with one aspect, the bushing body includes two substantially symmetrical sections. The bushing body can include means for joining the sections of the bushing body together with bolts, or any other suitable means for joining the sections. It is contemplated that the means for joining the sections of the bushing body together can be configured and adapted to be accessible for assembly and disassembly of the bushing body within a doghouse structure of a vertical pulverizer. Each section of the bushing body can include a lower surface defining a portion of an annulus having opposed ends, a first end thereof including a protrusion, and a second end thereof including a receptacle configured and adapted to receive a protrusion of an opposed bushing body section.

In another aspect, each section of the bushing body includes an upper tapered portion proximate the bushing surface and a lower portion joined to the tapered portion. The lower portions of the sections of the bushing body can be configured and adapted to be joined together into a substantially cylindrical portion of the bushing body.

The invention also includes a guide bushing for use with a vertical pulverizer including an elongate bushing body that defines a longitudinal axis and includes a cylindrical portion coaxially joined at one end to a frustoconical portion converging away from the cylindrical portion. The frustoconical portion defines an inward bushing surface therethrough along the longitudinal axis configured and adapted for moveable engagement with a tensioning rod of a vertical pulverizer. The elongate bushing body is divided substantially in half circumferentially about the longitudinal axis into a pair of substantially symmetrical bushing body sections configured and adapted to be joined together about a tensioning rod of a vertical pulverizer, and to be separated from one another for installation onto and removal from a vertical pulverizer. It is contemplated that the cylindrical and frustoconical portions can be welded together. Moreover, it is envisioned that the bushing body sections can include mating surfaces defined on a plane aligned with the longitudinal axis of the bushing body.

These and other features of the guide bushings of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the guide bushing of the subject invention without undue experimentation, preferred embodiments thereof will be described in detail herein below with reference to certain figures, wherein.

DETAILED DESCRIPTION OF THE PREFERRED EMBODIMENTS

Figure 1:
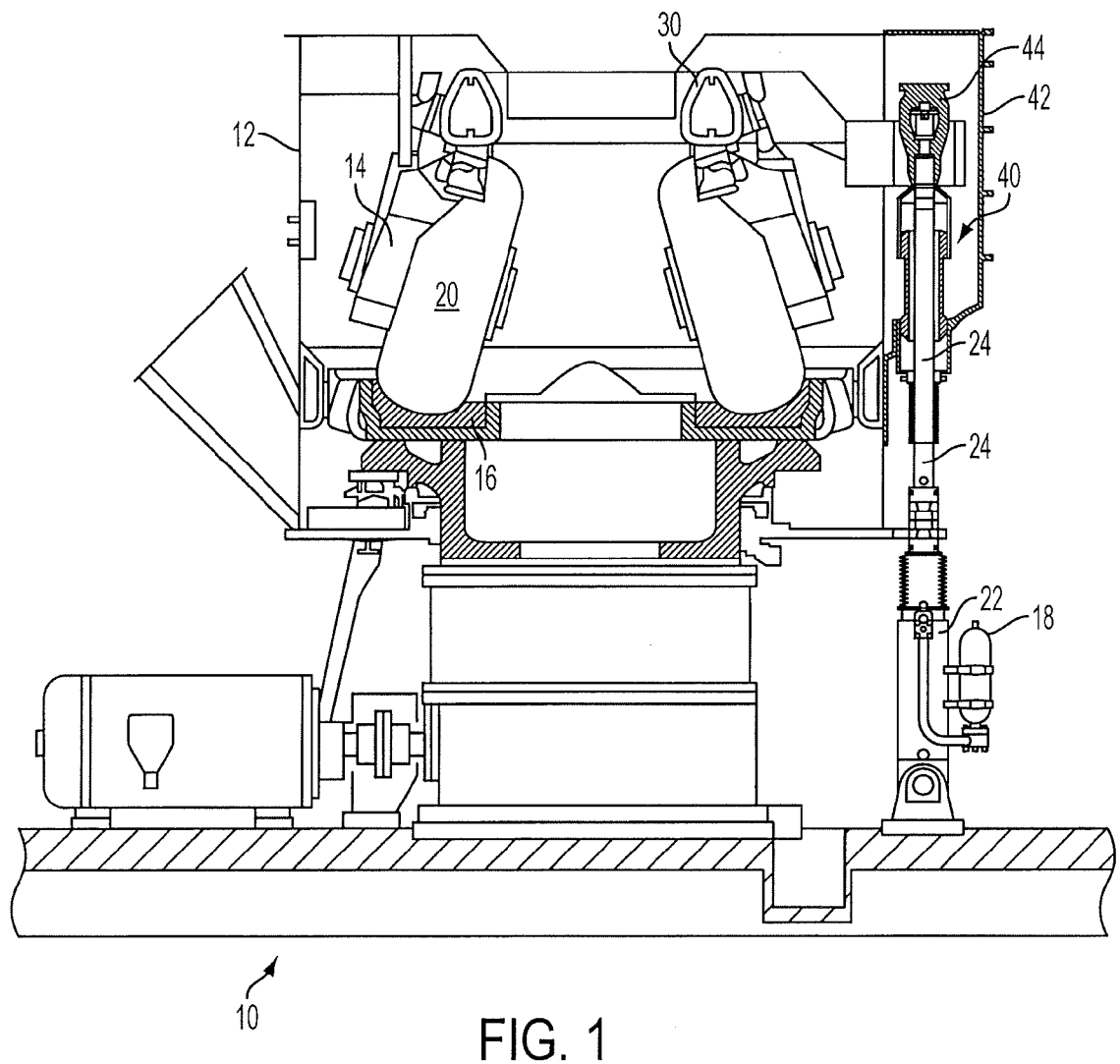
FIG. 1 is a partially cross-sectional side elevation view of a prior art vertical roller mill pulverizer, showing the guide bushing for the tensioning rod within the doghouse structure.

Reference will now be made to the drawings wherein like reference numerals identify similar structural features or aspects of the subject invention. In accordance with the invention, a guide bushing for a tensioning rod in a vertical coal pulverizer is provided. The guide bushing includes a bushing body having a substantially cylindrical interior bushing surface configured and adapted to moveably engage a tensioning rod of a vertical pulverizer. The bushing body is divided circumferentially about the bushing surface into a plurality of sections joined together. The sections are configured and adapted to separate from one another for installation and removal of the bushing body about a tensioning rod of a vertical pulverizer.

FIG. 1 shows a cut away side elevation view of a prior art vertical roller-table mill generally designated 10, for grinding incoming material such as coal. The grinding or crushing of coal in the pulverizer 10 is conducted within a pulverizer housing 12. The pulverizer housing 12 contains a plurality of roll wheel assemblies 14, typically three in number, which are pressed against a grinding table 16 by a guiding frame 30 coupled to tensioning rod 24. The grinding table 16 rotates about a vertical axis of the pulverizer 10, and each of the roll wheel assemblies 14 has a replaceable outer grinding element or tire 20 mounted for rotation thereon. Each tire 20 rotates around its respective axis of rotation through contact against the grinding table 16. Incoming material is crushed between tires 20 and grinding table 16.

In preparation to operate pulverizer 10, it is necessary to preload guiding frame 30. FIG. 1 shows a mechanism for preloading the guiding frame 30. A hydraulic cylinder 22 is used to apply a force to a tensioning rod 24, which is connected to guide frame 30. When a downward force is applied by hydraulic cylinder 22 to guide frame 30, the force is transferred into roller wheel assemblies 14. With the system preloaded in this manner, pressure is applied between the tire 20 and grinding table 16. During operation of pulverizer 10, hydropneumatic cylinder 18 is connected to hydraulic cylinder 22 to provide resilience, allowing for shock absorption. This shock absorbing function protects pulverizer 10 from vibrations from coal or other material being ground between tires 20 and grinding table 16.

As hydraulic cylinder 22 loads and unloads the system, there can be significant vertical movement by tensioning rod 24 in both directions. Guide bushing 40 provides a stationary bushing surface to accommodate the vertical movement of tensioning rod 24. If a tensioning rod 24 or guide bushing 40 fails or otherwise needs to be removed or replaced, doghouse 42 and articulated head 44 of tensioning rod 24 must be removed before guide bushing 40 can be removed over the end of tensioning rod 24. The load of loading frame 30 and three wheel assemblies 14 including tires 20, normally supported by tensioning rod 24, must be transferred to some other support during the replacement procedure. Thus in short, removing previously known guide bushings is a difficult and time consuming process, which can result in approximately three to five days of down time.

Figure 2:
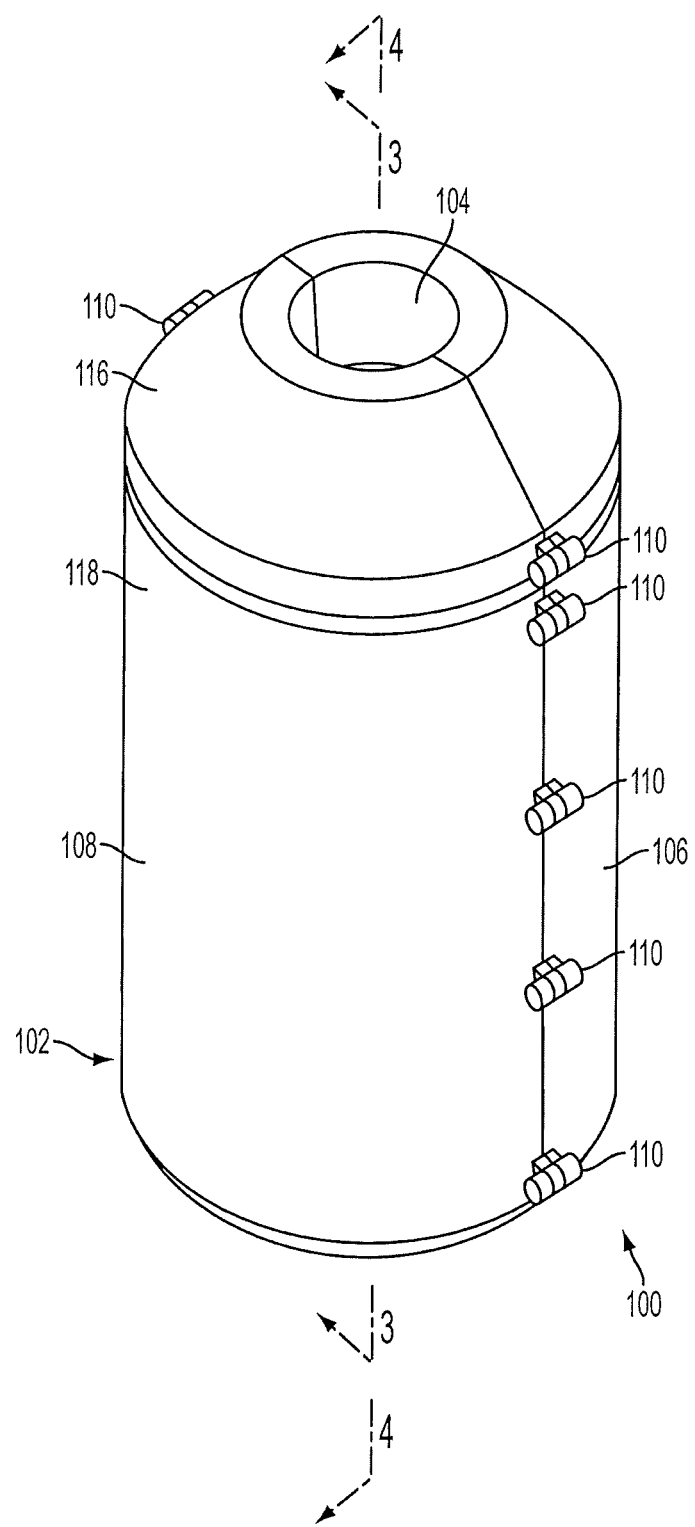
FIG. 2 is a perspective view of a representative embodiment of a guide bushing constructed in accordance with the present invention, showing two joined sections of the guide bushing.

For purpose of explanation and illustration, and not limitation, a partial view of an exemplary embodiment of a guide bushing in accordance with the invention is shown in FIG. 2 and is designated generally by reference character 100. Other embodiments of a guide bushing in accordance with the invention, or aspects thereof, are provided in FIGS. 3-5, as will be described. The system of the invention can be used as a guide bushing for a tensioning rod in a vertical pulverizer, or in any other suitable application, for facilitating removal and installation of the guide bushing and related components.

As shown in FIG. 2, guide bushing 100 includes a bushing body 102 having a substantially cylindrical interior bushing surface 104 configured and adapted to moveably engage a tensioning rod (e.g. rod 24 of FIG. 1) of a vertical pulverizer. Bushing body 102 is divided circumferentially about the bushing surface into a plurality of sections 106/108 joined together. Sections 106/108 are configured and adapted to separate from one another for installation and removal of bushing body 102 about a tensioning rod of a vertical pulverizer.

In accordance with one aspect, the bushing body includes two substantially symmetrical sections 106/108. However, those skilled in the art will readily appreciate that three or more sections can be used, whether identical or not, without departing from the scope of the invention.

Bushing body 102 can include means 110 for joining sections 106/108 of bushing body 102 together with bolts, or any other suitable means for joining the sections. Means 110 for joining sections 106/108 of bushing body 102 together protrude from the main surfaces of bushing body 102 along the sides thereof so as to be readily accessible for assembly and disassembly of bushing body 102 when it is within a doghouse structure (e.g. doghouse 42 in FIG. 1) of a vertical pulverizer.

Figure 3:
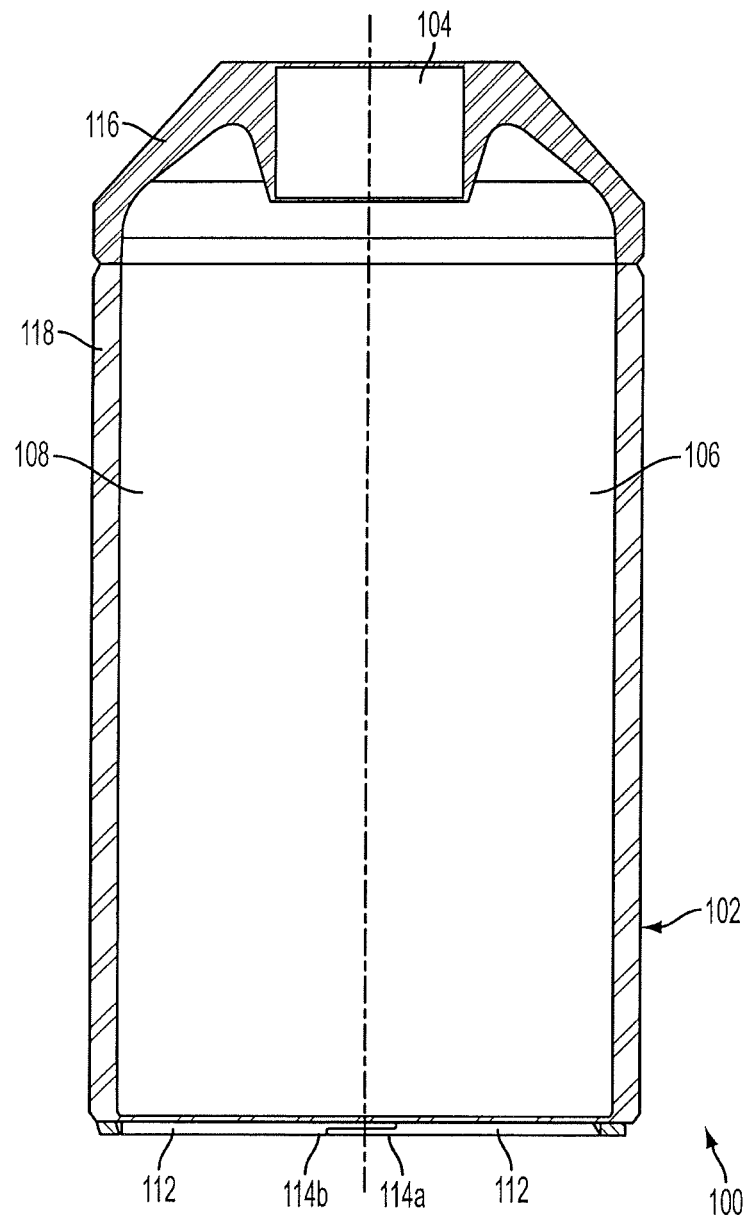
FIG. 3 is a cross-sectional side elevation view of the guide bushing of FIG. 2, showing the internal bushing surface, as well as the cylindrical and frustoconical sections of the bushing body.
Figure 4:
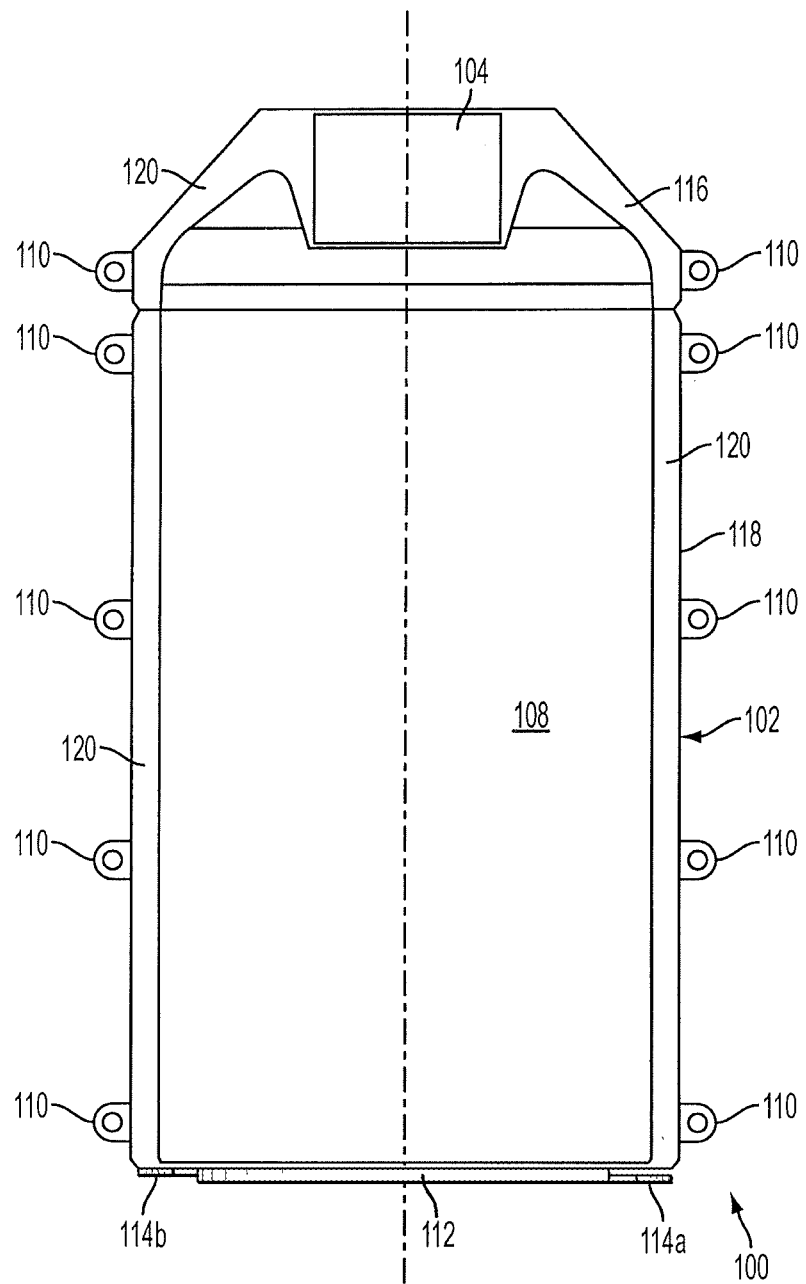
FIG. 4 is a cross-sectional front elevation view of the guide bushing of FIG. 2, showing the means for bolting the guide bushing sections together, as well as the mating surface.
Figure 5:
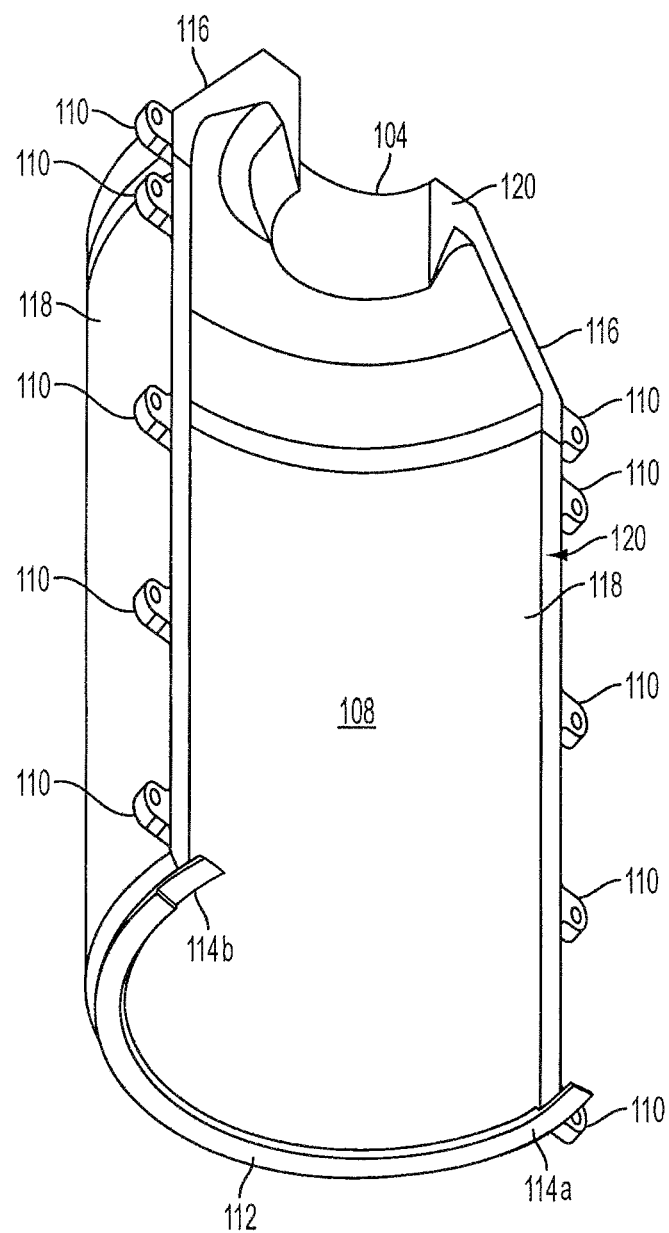
FIG. 5 is a perspective view of an embodiment of a guide bushing section constructed in accordance with the present invention, showing the protrusion and protrusion receptacle on the bottom semi-annular surface portion.

As shown in FIGS. 3-5, each section 106/108 of bushing body 102 has a lower surface 112 generally shaped as a half annulus having opposed ends 114a and 114b. First end 114a includes a protrusion, and second end 114b includes a receptacle configured and adapted to receive a protrusion (e.g. 114a) of an opposed bushing body section. FIG. 5 shows ends 114a and 114b of a single bushing body section 108, and FIG. 3 shows interlocked ends 114a and 114b of opposed bushing body sections 106/108. Interlocking ends 114a and 114b serve to retain seal air pressure.

With reference now to FIG. 4, each section 106/108 of bushing body 102 includes an upper tapered or generally frustoconical portion 116 proximate bushing surface 104 and a lower portion 118 joined to tapered portion 116. Frustoconical portion 116 defines inward bushing surface 104 therethrough along the longitudinal axis of frustoconical portion 116 and is thus configured and adapted for moveable engagement with a tensioning rod of a vertical pulverizer. Lower portions 118 of joined sections 106/108 together form a substantially cylindrical portion of bushing body 102. Thus guide bushing 100 includes elongate bushing body 102 that defines a longitudinal axis. Cylindrical portion 118 and frustoconical portion 116 are coaxially joined at one end with frustoconical portion 116 converging away from the cylindrical portion 118. It is contemplated that cylindrical and frustoconical portions 116/118 can be welded together, can be formed integrally together, or can be joined in any other suitable way. Bushing body sections 106/108 include mating surfaces 120 defined on a plane aligned with the longitudinal axis of the bushing body. When assembled, mating surfaces 120 of opposed sections 106/108 engage one another to form guide bushing 100.

When a guide bushing (e.g. guide bushing 100) must be removed from the respective tensioning rod (e.g. tensioning rod 24) in a vertical pulverizer (e.g. pulverizer 10), as when replacing the tensioning rod, guide busing, or other related component, the guide bushing can be accessed through the doghouse structure (e.g. doghouse 42). It is advantageous for the doghouse structure to have an access panel or door that can provide access to the guide bushing. However, if no door or access panel is included on the doghouse structure, an access port can be cut into the doghouse structure, for example with a cutting torch.

If the sections (e.g. sections 106/108) of the guide busing are joined with bolts (or other suitable means of joining), the bolts can be removed from one or more of the sections to allow separation of the sections from the tensioning rod. Each section can be removed through the access in the doghouse structure. With the guide bushing removed, any further work can be performed, for example replacement of a tensioning rod or other related components. That being accomplished, the split guide bushing (or if applicable, a replacement guide bushing) can be returned around the tensioning rod through the doghouse access. The sections of the guide bushing can be joined together by bolts, washers, nuts, and/or other suitable joining means and the doghouse access can be re-closed. If an access was cut through the doghouse, the removed material can be welded back in place, or an access panel or door can be installed for future access.

Those skilled in the art will appreciate that if the tensioning rod does not need to be removed, there is no reason to transfer the load off from the tensioning rod when removing the guide bushing, due to the ability of the guide bushing to split into sections. The doghouse does not need to be removed when replacing the guide bushing. The Moreover, if typical nuts and bolts are used to join the sections of the guide bushing, a simple ratchet and/or wrench are all that is needed to separate the sections from one another.

Since guide bushings constructed in accordance with the present invention have the ability to be readily split into sections for removal or replacement, the removal/installation procedure can be completed with only about one or two days of down time. This is a substantial improvement over previously known guide bushings, which as described above require approximately three to five days of down time to accomplish the same task. There is also reduced downtime if the tensioning rod components, including the tie rod itself, must be replaced.

The methods and systems of the present invention, as described above and shown in the drawings, provide for a guide bushing with superior properties including improved ease of removal and installation. This improved ease of removal and installation leads to improved operability of the vertical pulverizer, including significantly reduced downtime for replacement, repairs, and maintenance requiring removal or replacement of the guide bushing. While the apparatus and methods of subject invention have been shown and described with reference to preferred embodiments, those skilled in the art will readily appreciate that changes and/or modifications may be made thereto without departing from the spirit and scope of the subject invention.

What is claimed is:

1. A guide bushing for a tensioning rod in a vertical pulverizer, comprising: a bushing body having a substantially cylindrical interior bushing surface configured and adapted to moveably engage the tensioning rod of the vertical pulverizer, wherein the bushing body is divided circumferentially about the bushing surface into a plurality of sections joined together, the sections being configured and adapted to separate from one another for installation and removal of the bushing body about the tensioning rod of the vertical pulverizer, wherein each section of the bushing body includes a lower surface defining a portion of an annulus having opposed ends, a first end thereof including a protrusion, and a second end thereof including a receptacle configured and adapted to receive the protrusion of an opposed substantially identical bushing body section.

2. A guide bushing as recited in claim 1, wherein the bushing body includes two substantially identical sections.

3. A guide bushing as recited in claim 1, wherein the bushing body includes means for joining the sections of the bushing body together with bolts.

4. A guide bushing as recited in claim 3, wherein the means for joining the sections of the bushing body together is configured and adapted to be accessible for assembly and disassembly of the bushing body within a doghouse structure of the vertical pulverizer.

5. A guide bushing as recited in claim 1, wherein each section of the bushing body includes an upper tapered portion proximate the bushing surface and a lower portion joined to the tapered portion.

6. A guide bushing as recited in claim 5, wherein the lower portions of the sections of the bushing body are configured and adapted to be joined together into a substantially cylindrical portion of the bushing body.

7. A guide bushing section for use with a vertical pulverizer comprising: a bushing body section having a bushing surface configured and adapted to moveably engage a tensioning rod of the vertical pulverizer and a mating surface configured and adapted to engage a mating surface of at least one other bushing body section to form a guide bushing about the tensioning rod in the vertical pulverizer, wherein the bushing body section includes a lower surface defining a portion of an annulus having opposed ends, a first end thereof including a protrusion, and a second end thereof including a receptacle configured and adapted to receive the protrusion of the at least one other bushing body section.

8. A guide bushing section as recited in claim 7, wherein the bushing body section is configured and adapted to form a guide bushing with one other bushing body section that is substantially symmetrical therewith.

9. A guide bushing section as recited in claim 7, wherein the bushing body section includes means for joining the bushing body section to at least one other bushing body section with bolts.

10. A guide bushing section as recited in claim 9, wherein the means for joining is configured and adapted to be accessible for assembly and disassembly of the bushing body section with at least one other bushing body section within a doghouse structure of the vertical pulverizer.

11. A guide bushing section as recited in claim 7, wherein the bushing body section includes an upper tapered portion proximate the bushing surface and a lower portion joined to the tapered portion.

12. A guide bushing section as recited in claim 11, wherein the lower portion of the bushing body section is configured and adapted to be joined together with a lower portion of at least one other bushing body section into a substantially cylindrical portion of a bushing body.

13. A guide bushing for use with a vertical pulverizer comprising:

an elongate bushing body defining a longitudinal axis and including a cylindrical portion coaxially joined at one end to a frustoconical portion converging away from the cylindrical portion, wherein the frustoconical portion defines an inward bushing surface therethrough along the longitudinal axis configured and adapted for moveable engagement with a tensioning rod of the vertical pulverizer, and wherein the elongate bushing body is divided substantially in half circumferentially about the longitudinal axis into a pair of substantially symmetrically opposed bushing body sections configured and adapted to be joined together about the tensioning rod of the vertical pulverizer, and to be separated from one another for installation onto and removal from the vertical pulverizer.

14. A guide bushing as recited in claim 13, wherein the bushing body includes means for joining the bushing body sections together with bolts.

15. A guide bushing as recited in claim 14, wherein the means for joining the bushing body sections together is configured and adapted to be accessible for assembly and disassembly of the bushing body within a doghouse structure of the vertical pulverizer.

16. A guide bushing as recited in claim 13, wherein each bushing body section includes a lower surface defining a portion of an annulus having opposed ends, a first end thereof including a protrusion, and a second end thereof including a receptacle configured and adapted to receive the protrusion of the opposed bushing body section.

17. A guide bushing as recited in claim 13, wherein the cylindrical and frustoconical portions are welded together.

18. A guide bushing as recited in claim 13, wherein the bushing body sections include mating surfaces defined on a plane aligned with the longitudinal axis of the bushing body.

* * * * *